June 21, 1960      V. A. HOOVER      2,941,638

MECHANICAL ACTUATOR INTERLOCKING SYSTEM

Original Filed April 14, 1953      4 Sheets-Sheet 1

INVENTOR.
VAINO A. HOOVER
BY
Attorneys

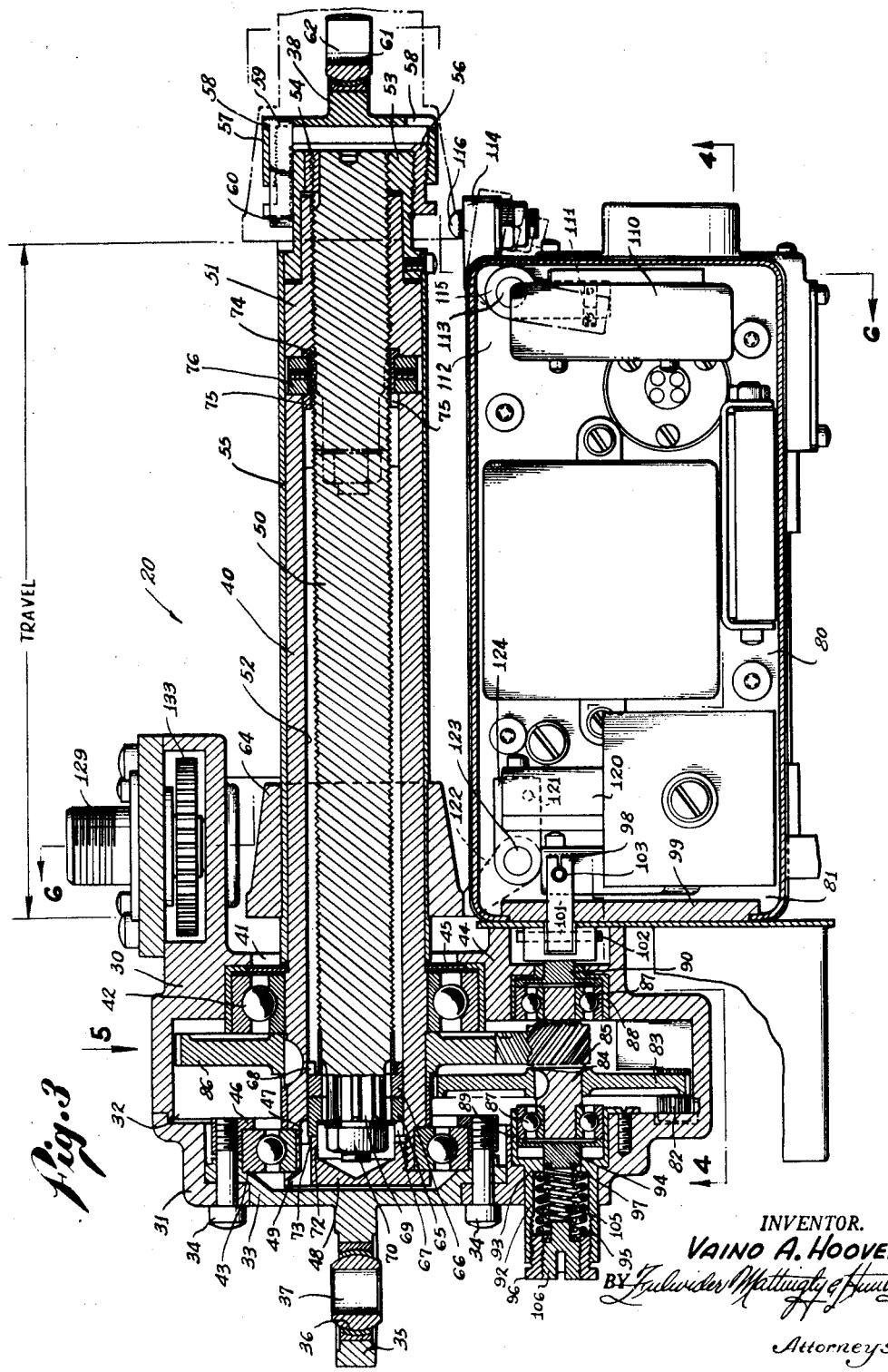

June 21, 1960 V. A. HOOVER 2,941,638
MECHANICAL ACTUATOR INTERLOCKING SYSTEM
Original Filed April 14, 1953 4 Sheets-Sheet 3
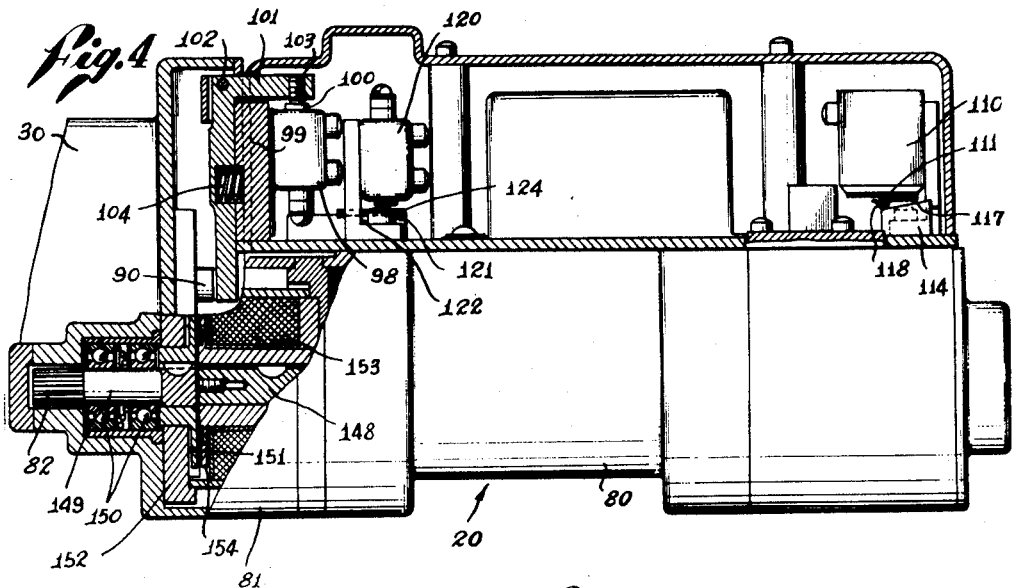
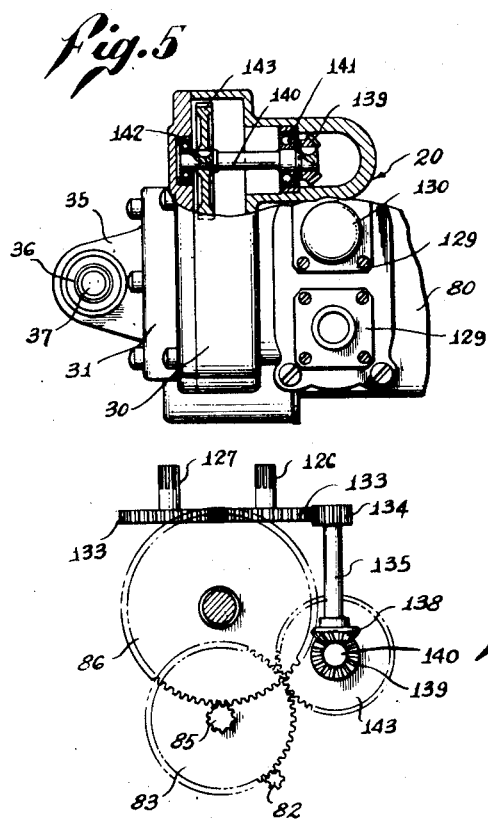
INVENTOR.
VAINO A. HOOVER June 21, 1960 V. A. HOOVER 2,941,638
MECHANICAL ACTUATOR INTERLOCKING SYSTEM
Original Filed April 14, 1953 4 Sheets-Sheet 4
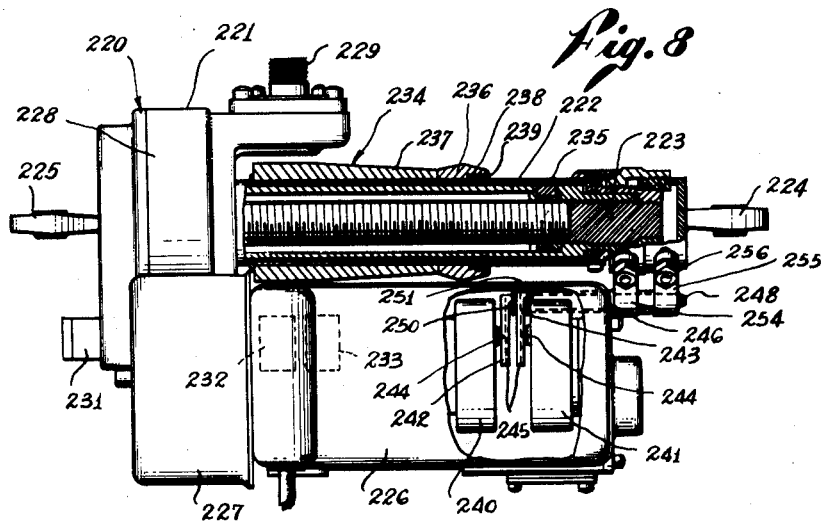
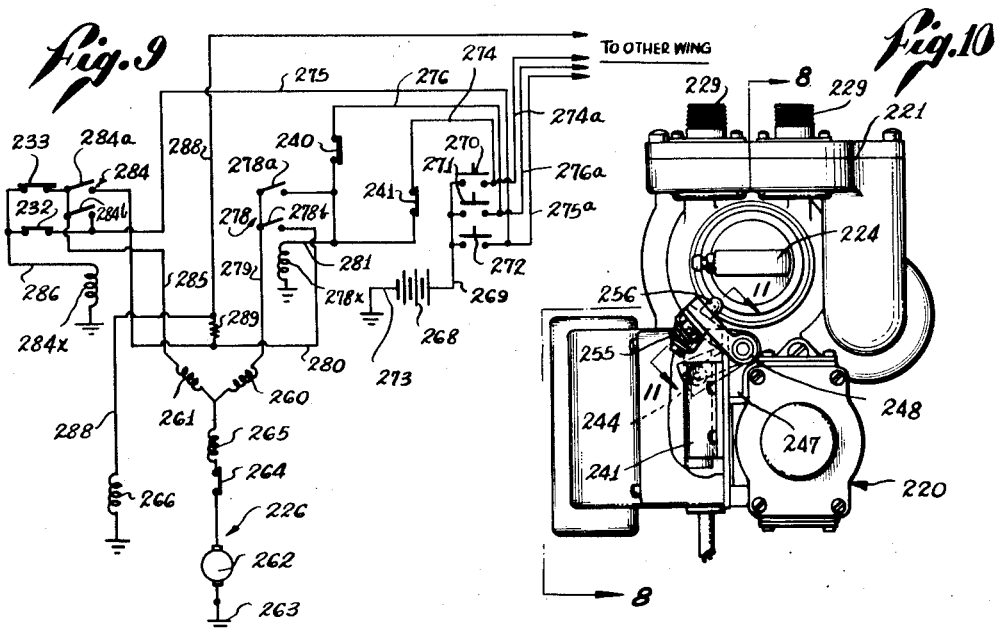
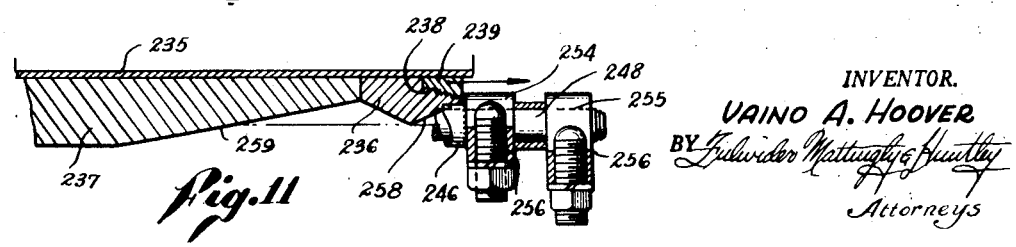
INVENTOR.
VAINO A. HOOVER

United States Patent Office 2,941,638
Patented June 21, 1960

2,941,638

MECHANICAL ACTUATOR INTERLOCKING SYSTEM

Vaino A. Hoover, 2100 S. Stoner Ave., Los Angeles, Calif.

Original application Apr. 14, 1953, Ser. No. 348,741, now Patent No. 2,809,736, dated Oct. 15, 1957. Divided and this application Aug. 12, 1957, Ser. No. 677,736

14 Claims. (Cl. 192—.02)

This application is a division of my copending application Serial No. 348,741, filed April 14, 1953 and entitled, "Mechanical Actuator," now Patent No. 2,809,-736, dated October 15, 1957, and relates particularly to a system for operating a pair of mechanical actuators of the general type disclosed in the above-mentioned copending application in an interlocked relationship, whereby the motor of one of the actuators can drive both, should the motor of the other fail.

An interlocking system of this type is particularly useful in installations wherein pairs of actuators are used for actuating right and left hand parts. In such installations it is often quite advantageous for the drive motor of one actuator to be capable of driving both so that even if one of the drive motors should fail, the parts will still be moved in unison. For example, if the pairs of actuators were used to move the wing flaps of an aircraft where it is highly important to the stability of the aircraft that both wing flaps always be moved an equal amount, failure of the drive motor of one actuator would be quite a serious thing unless the pair of actuators were interlocked in some manner.

It is therefore an important object of my invention to provide mechanical interconnecting means for coupling a pair of actuators together so that in the event of a motor failure of one unit, both actuators may be driven from the remaining motor.

In this connection it should be noted that the actuators utilized in my system have a magnetic clutch of the general type disclosed in my Patent No. 2,618,368 issued November 18, 1952 for Magnetic Clutch. Such a device includes a composite clutch and brake means for connecting the actuator drive with the motor shaft when the motor is energized, and connecting the drive to braking means when the motor is de-energized. Thus the actuator is positively held in a stopped position so that there can be no inadvertent movement of the device controlled by the actuator.

It is therefore another object of my invention to provide a control circuit having means for energizing the clutch and brake of one actuator from the motor circuit of a paired actuator so as to release the braking means of the first actuator despite a failure of that motor or the electrical supply associated therewith, thus permitting both actuators to be operated by the one motor.

Still a further object of my invention is to provide mechanical actuators operable as a pair in an interlocked system of the type described which are so constructed that each actuator may serve as either the right hand or left hand member of the pair.

Still another object of the invention is to provide a system comprising a pair of actuators interlocked as described, which is relatively simple and inexpensive.

These and other objects and advantages of the invention will become apparent from the following detailed description of preferred and modified forms thereof, and from an inspection of the accompanying drawings, in which:

Figure 3 is a longitudinal medial section through the preferred form of the actuator;

Figure 4 is an upwardly-directed view, partially in section, taken along the line 4—4 in Figure 3;

Figure 5 is a plan view partially in section taken in the direction of the arrow 5 of Figure 3;

Figure 6 is a cross-section taken along the line 6—6 of Figure 3;

Figure 7 is a schematic detail of the actuator and cross shaft drive means in the preferred actuator;

Figure 8 is a side elevation partially in section of a modified form of wing flap actuator taken along the line 8—8 of Figure 10;

Figure 9 is a partial wiring diagram of the electrical control circuit for a pair of modified actuators;

Figure 10 is an end elevation of the modified actuator; and

Figure 11 is an enlarged detail of the ring cam and limit switch operators taken along the line 11—11 of Figure 10.

Figure 1:
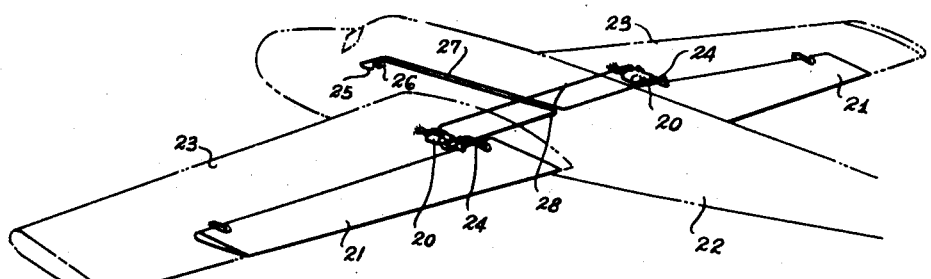
Figure 1 is a schematic view of an airplane showing a pair of wing-flap actuators installed therein and mechanically and electrically interconnected.

Referring now to the drawings, and particularly to Figure 1 thereof, a preferred form of the invention is shown installed for moving wing flaps 21 of a typical aircraft 22. Flaps 21 are movable pivotally from the normally retracted position in which they are aligned with the trailing edges of wings 23, to a downwardly-inclined, extended position. In order to move flaps 21 I provide a pair of actuators 20 mounted in the structure of wings 23 and connected, one to each of the flaps, by suitable linkages 24. The arrangement is such that linear extension of each actuator 20 causes downward movement of the connected flap 21, and retraction of the actuators brings the flaps upwardly to the normal position.

Mounted in the cockpit of the airplane 22, or at other suitable control station, are normally open "extend" and "retract" control switches 25 and 26, respectively, which are interconnected with both of the actuators 20 by an electrical control circuit 27. Upon closing of the "extend" switch 25, both of the flaps 21 are simultaneously lowered, and upon closing of "retract" switch 26 both of the flaps are simultaneously retracted. It should also be noted that actuators 20 are cross-connected by a shaft 28 in the form of a flexible rotatable cable to provide a mechanical interlock, as will later be described.

As best seen in Figure 3, the actuator 20 has a housing 30 in which is mounted a rotatable and axially immovable elongated nut 40. Engaged within the nut 40 is an axially movable and non-rotatable screw 50 carrying on its outer end an attaching ear 38 which is linearly movable with respect to an opposite ear 35 secured to the housing 30. The means for driving nut 40 include a drive motor 80 driving through a magnetic clutch and brake unit 81 of the type previously mentioned, to a reduction gear drive which is in turn connected to the driving nut.

The nature of linkage 24 is such as to prevent rotation of ear 38 about the axis of the screw 50, so that screw 50 is held against rotation although it is free to move longitudinally. Rotation of nut 40 therefore causes screw 50 to extend or retract relative to housing 30 and the fixed securing ear 35. As screw 50 is extended, a cover 55 which is mounted thereon moves outwardly relative to nut 40, so that the extended portion of the screw is always covered and protected. Near the inner end of cover 55 a ring cam 64 is affixed for movement with the cover. Cam 64 operates the electrical limit switches of the device, as will later be described.

To assure accurate control of the retraction of the flaps 21 a load-limiting mechanism is provided which opens a load limit switch 98 mounted on motor 80, to de-energize motor 80 when nut 40 is rotated in a retracting direction to engage the inner end mechanical stops as screw 50 reaches the fully retracted position. The inner end mechanical stops are of the non-jamming type disclosed in my Patent No. 2,590,251 issued March 25, 1952 and entitled, Mechanical Actuator. By the provision of this mechanism I am able to bring flaps 21 into a fully retracted position determined positively by the position of the mechanical stops. Since the position of flaps 21 has a considerable effect upon the flight characteristics of the aircraft, it is important that this accurate control of the retraction of the flaps 21 be made possible.

In order to limit the outward travel of screw 50, I provide an outer or extend limit switch 110 which acts to de-energize motor 80 when the screw reaches a position just short of engaging its outer stop.

With the arrangement thus far described, switch 98 operates to de-energize motor 80 when the inner limit of travel is reached, and switch 110 when the outer limit is reached. Since the action of switch 98 occurs upon a torque overload due to the engagement of the inner mechanical stops, it is desirable that another inner limit or shorting switch 120 be provided. Switch 120 is set to open only when screw 50 has closely approached the inner limit of travel, and its purpose is to prevent switch 98 from operating to de-energize motor 80 by reason of a torque overload during the major portion of the travel of the screw through the retracting stroke. In other words, the normally closed shorting switch 120 renders switch 98 ineffective to de-energize motor 80 at any time except when screw 50 has closely approached the inner limit of travel determined by the mechanical stops. The electrical circuit for this arrangement will later be described.

In order to mechanically couple both actuators 20 together so that the motor 80 of one actuator may drive both actuators in the event of a power failure in the other motor, a pair of driving pinions 126 and 127 are mounted in the top of the housing 30 for connection with the previously-mentioned flexible shaft 28 which is extended between the actuators. Pinions 126 and 127 rotate in opposite directions, and either may be connected to shaft 28 so that the actuators 20 may be made identical without incurring any difficulty due to right and left hand installations.

As is best seen in Figures 3, 5 and 6, pinions 126 and 127 are formed on the upper ends of stub shafts which project upwardly through receptacles 129 mounted on housing 30. A cap 130 threadedly engages one of the receptacles 129 to cover the pinion 126 or 127 which is not connected to shaft 28. Both pinions 126 and 127 are rotatably supported in housing 30 by sets of upper and lower bearings 131 and 132, respectively, and carry idler gears 133 which are intermeshed with each other. At the side of one of the gears 133 is a pinion 134 which is affixed to a shaft 135 that extends downwardly and is supported by upper and lower bearings 136 and 137, respectively. As can be seen, rotation of shaft 135 causes rotation of pinion 126 in one direction and rotation of pinion 127 in the other direction. By coupling shaft 28 to one or the other of the pinions, I thus insure that both actuators 20 may be connected together for simultaneous extension and retraction as desired.

On the lower end of shaft 135 is a miter gear 138 which meshes with a miter gear 139 lying at right angles thereto and affixed to a horizontally extending rotatable shaft 140. Shaft 140 is supported in housing 30 by end bearings 141 and 142 and has fixed thereon a spur gear 143 which is connected by other gears to a driving pinion 82. The complete drive gearing may best be seen and followed in the diagrammatic view of Figure 7.

By reason of the gearing just described, both actuators 20 are locked mechanically together and under normal conditions the motors 80 share the load of driving screws 50. When one motor 80 cannot be energized, the remaining motor 80 will drive both screws 50 so that the flaps 21 will always move together. When both motors 80 are de-energized it is desirable that both screws 50 be locked against inadvertent movement, and this requires that the drive gearing of the actuators 20 be locked against rotation.

As previously mentioned, in the actuators utilized in my system the drive pinions 82 are connected to the motors 80 through magnetic clutch and brake units 81. The function of unit 81 is to connect pinion 82 to the motor drive shaft when motor 80 is energized, and to hold pinion 82 against rotation when the motor is de-energized. The unit 91 is of the type disclosed in my aforementioned Patent No. 2,618,368, and ference is made thereto for a complete description of the device. Briefly considered, the unit 81, as is seen in Figure 4, has a drive shaft 148 which is an extension of the armature shaft of motor 80. Coaxially aligned with shaft 148 is a shaft 149 supported by bearings 150 and carrying on its outer end the drive pinion 82. Shaft 148 is axially movable and carries on its inner end a disk 151 which is normally urged against a stationary plate 152, so that the friction between the two acts as a brake to prevent rotation of pinion 82. When the clutch is to be engaged, motor 80 is energized, and current passes through a clutch coil 153 that surrounds shaft 148. This causes shaft 148 and disk 151 to move axially toward shaft 148, the disk then being separated from the stationary plate 152 and engaging a driving disk 154 mounted upon and driven by shaft 148. When this occurs the frictional engagement between disks 151 and 154 causes these elements to rotate together, thereby turning pinion 82 with the motor shaft.

It can therefore be seen that pinion 82 is normally held against rotation, but is drivably engaged with motor 80 upon energization of the latter by energization at the same time of the clutch coil 153. When both motors 80 are energized there is, of course, no problem since both clutch coils 153 are energized and both pinions 82 are drivably engaged with their respective motors. However, when there is an electrical failure of one motor 80 or the electrical supply associated therewith, it is necessary to free the drive pinion 82 of that actuator 20, in order that the gearing connected thereto can be rotated by the mechanical cross-connection with the other actuator. For this reason it is necessary to provide an auxiliary clutch or brake releasing coil 155 which may be energized independently of the motor 80 of that actuator. Coil 155 is electrically connected to the motor 80 of the other actuator and is energized thereby. The strength of coil 155 is such as to release disk 151 from stationary plate 152, but is somewhat less than that of coil 153, so that disk 151 is not driven into tight frictional engagement with disk 154. Thus the pinion 82 is free from the stationary brake and is also free from engagement with the motor 80 that is not energized. Both screws 50 can therefore be driven from the remaining motor 80, and there is no drag caused by attempting to rotate the other motor. In Figure 4, coils 153 and 155 are indicated together, the latter merely constituting a portion of the windings of the former.

Figure 2:
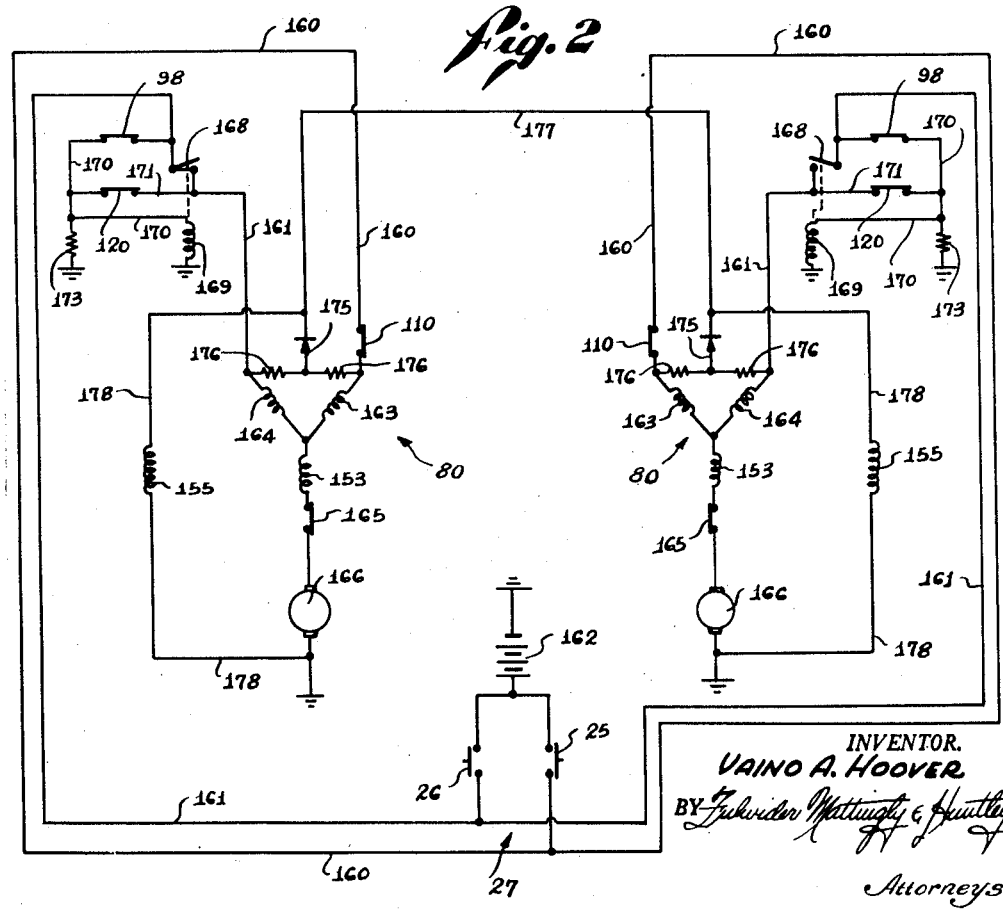
Figure 2 is a wiring diagram of the electrical control circuit for a preferred form of paired actuators.

The electrical circuit connections indicated generally at 27 in Figure 1 making possible the operation just described are best understood by considering Figure 2. As shown therein, leads 160 and 161 extend from a source of D.C. power 162 through "extend" and "retract" control switches 25 and 26, respectively, to "extend" and "retract" series field windings 163 and 164 which are located in motor 80. The field windings 163 and 164 are interconnected and connected to one terminal of the main clutch coil 153, the other terminal thereof being connected through a thermal overload switch 165 to one terminal of a motor armature winding 166. The other terminal of the armature 166 is grounded, as is one terminal of the battery 162. Upon closing "extend" switch 25, current flows through lead 160 to winding 163 for driving the motor 80 in one direction, while closing "retract" switch 26 energizes winding 164 for driving the motor in the opposite direction.

The normally closed outer or "extend" limit switch 110 is connected in lead 160 to open the circuit to motor 80 when the outer limit of travel of screw 50 is reached. In the lead 161 connected to the "retract" winding 164 are connected normally open contacts 168 of a relay 169. The coil of relay 169 is connected between lead 161 on the line side of contacts 168 and ground by a conductor 170 and torque overload switch 98. Coil 169 is shunted by a loading resistance 173. Shunted across between lead 170 and lead 161 on the load side of contacts 168 is the load limit shorting switch 120.

By this arrangement it can be seen that when "retract" switch 26 is closed, coil 169 is energized through normally closed load-limiting switch 98 to close contacts 168 and energize the motor through the retract winding 164. Motor 80 drives screw 50 inwardly, and since switch 120 is closed until the inner limit of travel is approached, coil 169 will be eneregized even though the load switch 98 should open. Thus a torque overload during the retraction of screw 50 cannot de-energize motor 80 until the inner limit switch 120 has been opened. Once switch 120 has opened, the mechanical stops on screw 50 and nut 40 are about to engage and motor 80 is then under the exclusive control of load-limiting switch 98. Upon engagement of the mechanical stops, the torque load becomes greater than the maximum load setting of the load limit mechanism, and switch 98 is opened to de-energize coil 169 and motor 80.

For the purpose of energizing the auxiliary brake releasing coil 155 when the corresponding motor 80 has failed, I provide a cross-connection with the circuit of the opposite motor. At each of the motors 80, the leads 160 and 161 are interconnected by a pair of series connected resistances 176, and the common terminals of each pair of resistances 176 are interconnected through a pair of rectifiers 175 and a conductor 177 extending between the two rectifiers 175. The rectifiers 175 are arranged back-to-back to permit current flow from either of the leads 160 or 161 to the conductor 177, but prohibit reverse flow of current from conductor 177 to the field windings. A conductor 178 at each of the motors 80 connects the respective auxiliary brake release coil 155 between conductor 177 and ground. Accordingly, each coil 155 is energized at all times from the field windings of the opposite motor, but the rectifiers 175 prevent any cross-flow of current between the field windings.

If one motor 80, or the electrical supply thereto, has failed, that actuator 20 has the drive pinion 82 freed for rotation by the cross-energization of coil 155 to release disk 151 from brake 152. Since the gear trains are mechanically interconnected through pinions 126 and 127 and shaft 28, both screws 50 will be driven from the motor 80 of the other unit. I have thus provided a system in which both flaps must necessarily be moved together, and yet are each independently held against accidental movement.

In Figures 8 and 10 I have shown a modified form of my invention which is generally similar to the form just described, but has different control means. The purpose of the modified control means is to provide for the extension of the actuator screw to an intermediate position which is reached by opereating a separate control switch. Thus, for the type of installation previously described, the flaps 21 can be accurately stopped in a half-extended position, or in some other intermediate position determined by the setting of the control cams.

As is best seen in Figure 8, the actuator 220 has a housing 221 in which is mounted a rotatable and axially immovable elongated nut 222. Engaged within nut 222 is an axially movable and non-rotatable screw 223 carrying on its outer end an attaching ear 224 which is linearly movable with respect to an opposite ear 225 secured to housing 221. The means for driving nut 222 are the same as those previously described, and include a motor 226 driving through a magnetic clutch and brake unit 227 to a reduction gear drive 228, which is in turn connected to the driving nut.

At the top of housing 221 are a pair of coupling receptacles 229 which have therein driving pinions adapted for connection with a flexible shaft to mechanically interconnect the driving nuts 222 of a pair of actuators in the manner previously described. Mechanical limit stops similar to those previously mentioned are also provided, and means for insuring all retraction of screw 223 against the inner stop, including a load-limiting mechanism 231 connected to a load limit switch 232. A load limit shorting switch 233 is connected across switch 232 so as to render the latter ineffective to de-energize motor 228. Shorting switch 233 has an actuating lever (not shown) which is positioned so as to be moved in a direction to open the electrical contacts of switch 233 when screw 223 has approached the inner limit of its travel. Thus load limit switch 232 is effective only when the inner mechanical stops are about to engage. As can be appreciated, the device thus far described has the same construction as the preferred actuator, and it is not necessary to repeat the details of operation thereof.

In order to actuate the limit switches, a ring cam means 234 is mounted on an outer covering tube 235 which is affixed for linear movement with screw 223. Cam means 234 has an outer longitudinally adjustable collar member 236 and an inner elongated tapered sleeve 237 which is fixed in position relative to tube 235. Collar 236 has an internally threaded tapered socket portion 238 that takes a split colletlike lock ring 239 permitting the collar 236 to be moved to any desired location on the tube 235 and there secured by the clamping of the lock ring 239 by relative rotation of the parts 238 and 239.

Mounted on the motor 226 is an "intermediate" limit switch 240 and an "extend" limit switch 241 that are normally closed in the motor circuit, and adapted to be opened by the cam means 234. When "intermediate" limit switch 240 is opened, screw 223 is stopped accurately at an intermediate position determined by the longitudinal adjustment of collar 236 with respect to tube 235, and when the "extend" switch 241 is opened the screw is stopped in a fully extended position.

To operate switches 240 and 241 I provide actuating arms 242 and 243, respectively, which are pivotally mounted adjacent switch plungers 244 and extend outwardly from the adjacent sides of the switches. Upon inward depression of plungers 244, electrical contacts within the switches are moved from a closed to an open position. The arms 242 and 243 each have wedge-shaped surfaces 245 lying in a plane at right-angles to the axis of movement of plungers 244 and provided with thicker trailing portions which depress the plungers upon pivotal movement thereof. As is viewed in Figure 10, pivotal movement of arms 242 and 243 in a counter-clockwise direction causes plungers 244 to be depressed.

Arm 242 is affixed to a tubular shaft 246 which is rotatably supported in a bracket 247 secured to the housing of motor 228, and arm 243 is affixed to a shaft 248 which extends concentrically through shaft 246 and is rotatable therein. Coil springs 250 and 251 are wound around shafts 246 and 248 and secured between a fixed abutment and arms 242 and 243 in such a manner as to urge counterclockwise pivotal movement (Figure 10) thereof. Shaft 246 extends outwardly parallel to screw 223 and has fixed on its outer end an "intermediate" crank arm 254. Shaft 248 extends beyond crank arm 254 and has fixed on its outer end an "extend" crank arm 255. Both arms 254 anr 255 project upwardly and carry on the free end thereof adjustable engagement screws 256 which lie in the path of movement of the cam means 235.

As is best seen in the enlarged detail of Figure 11, the free end of "intermediate" crank arm 254 is spaced closer to the cover tube 236 than is arm 255, when both lie in their normal positions to which they are urged upwardly by springs 250 and 251. The cam collar 236 is of triangular section to provide a forward cam rise 258 which is adapted to engage "intermediate" crank 254 to pivot the same downwardly, but moves outwardly along a path, indicated in phantom line, that does not engage "extend" crank 255.

The tapered cam sleeve 237 which lies inwardly of collar 236 is of greater diameter than the collar and has formed thereon a cam rise 259 which is of a height sufficient to engage against the "extend" crank 255 and cause it to pivot downwardly. When crank 254 is pivoted downwardly, "intermediate" limit switch 240 is opened, and when crank 255 is pivoted downwardly, "extend" limit switch 241 is opened. Since the point of contact between crank 255 and cam rise 259 is spaced axially inwardly from the point of contact between cam rise 258 and crank 254, it can be seen that as screw 223 travels outwardly it causes switch 240 to be opened at an intermediate position of travel, and switch 241 to be opened in an extended position of travel. Thus switches 240 and 241 are properly actuated to control the movement of screw 223 to intermediate and extended positions. The locations of the intermediate position may be adjusted within limits as desired merely by adjusting the location of the ring cam 236 on the tube 235, such adjustment being permitted by the collet-like construction above described.

The electrical circuit for controlling the operation of motor 226 is shown in Figure 9. Motor 226 is of the split series field type having "extend" and "retract" field windings 260 and 261 each connected in series with the motor armature 262, one terminal of which is grounded as indicated at 263. Between field windings 260—261 and armature 262 is a thermal overload switch 264 and a clutch energizing coil 265. The clutch coil 265 and a brake releasing coil 266 are both part of the magnetic clutch and brake unit 227 which connects motor 226 with drive gearing 228. Unit 227 is of the same type found in the preferred form of actuator, and need not again be described in detail. Upon energization of coil 265 motor 226 is positively coupled to gearing 228, while upon energization of the auxiliary coil 266 the brake means holding gearing 228 against rotation are released.

Operation of the motor 226 is controlled by three control switches herein designated for convenience "extend" switch 270, "intermediate" switch 271, and "retract" switch 272. Like terminals of these three switches are connected together and to one terminal of a suitable source of D.C. power 268 as by a conductor 269, and the other power supply terminal is grounded as shown at 273.

Closing "extend" switch 270 connects power supply 268 and conductor 269 to an "extend" line 274 to thus energize the coil 278x of a relay 278, the coil 278x being connected between ground and a conductor 281 which is in turn connected to the "extend" line 274 by the normally closed contacts of the "extend" limit switch 241. Energization of relay coil 278x closes relay contacts 278a to connect conductor 281 to the "extend" field 260 of the motor 226 through conductor 279, thus energizing the motor 226 to drive the screw 223 toward the extended position. When the extended position is reached, "extend" limit switch 241 opens, de-energizing relay coil 278x and deenergizing motor 226 and clutch coil 265 with the resulting application of the brake to hold the apparatus in the extended position.

In a similar way, closing "intermediate" control switch 271 energizes an "intermediate" line 276 which is connected to the aforementioned conductor 281 through the normally closed contacts of the "intermediate" limit switch 240. In this way, the relay 278 is actuated and the motor 226 is operated in the extending direction until the operation is arrested by the opening of the "intermediate" limit switch 240 and the consequent de-energization of relay 278, motor 226 and clutch coil 265.

On the other hand, closing "retract" control switch 272 energizes a "retract" line 275 to thus energize the coil 284x of a relay 284, the coil 284x being connected between ground and a conductor 286 which is in turn connected to the "retract" line 275 by the normally closed contacts of the load limit switch 232. Energization of the relay coil 284x closes relay contacts 284a to connect the "retract" line 275 through conductor 285 to the "retract" field 261 of the motor 226, thus energizing the motor 226 to drive the screw 223 toward the retracted position.

Normally closed contacts of the "retract" limit switch 233 are connected between conductors 285 and 286 to short out the load limit switch 232 to render the latter ineffective to stop the operation of the motor 226 until the switch 233 is opened by close approach to the fully retracted position. When the mechanical stops are engaged at the fully retracted position, the load limit switch 232 opens, and, since the "retract" limit switch 233 is also open, de-energizes the relay 284, the motor 226, and the brake 265 so that the device is arrested and securely held in the fully retracted position.

The auxiliary brake release coil 266 is connnected between ground and an "interlock" conductor 288 which is in turn connected to one end of a current limiting resistance 289. The other end of the resistance 289 is connected to a conductor 290 which is connected through normally open contacts 278b of the relay 278 to the aforementioned conductor 279, and through normally open contacts 284b of the relay 284 to the aforementioned conductor 285. In this way, the auxiliary coil 266 is energized whenever power is supplied to the motor 226, whether by operation of the relay 278 or by operation of the relay 284.

In Figure 9 I have shown the circuit for only a single actuator 220, with leads 274a, 275a, and 276a joined to the conductors 274, 275, and 276, respectively, extending outwardly for connection to the circuit of a paired actuator. Again, as in the preferred actuator, the paired actuator units 220 are mechanically cross-connnected so that both will be driven from the motor 226 of one actuator in the event of a failure of the other motor. To accomplish this it is necessary that the auxiliary brake releasing coil 266 of each actuator be energized through the circuit of the other actuator, in order to release the brake means holding the drive gearing 228 against rotation. This result is secured by the "interlock" conductor 288.

As was previously described, the "interlock" conductor 288 is connected to both of relays 278 and 284 so that voltage is applied thereto whenever either of the relays are closed to drive motor 226. This energizes coil 266 from the opposite actuator circuit, even through the motor 226 of the first actuator has failed. The purpose of resistances 289 is to cause sufficient voltage drop to prevent any substantial current flow through the field windings of the deenergized motor 226, while permitting energization of coils 266. By energizing coils 266 the drive gearing 228 is released so that both actuators 220 may be driven simultaneously.

While I have shown and described specific embodiments of my invention which are particularly adapted to meet the requirements of the specific applications described, it will be understood that various of the components and their respective functions may be combined in different ways than are herein specifically set forth. Therefore, my invention is not to be restricted to the foregoing details of construction, except as defined in the appended claims.

I claim:

1. In a system having a pair of mechanical actuators: a motor for driving one of said actuators; a motor for driving the other of said actuators; means mechanically coupling said actuators for simultaneous movement; a brake means holding each of said actuators against movement, each of said brake means having an electrical coil operable to release said actuator upon energization thereof; an electrical circuit adapted for connecting each motor to a power source; and interlock means connecting each of said coils to its circuit, for releasing both of said brake means upon the energization of either of said circuits, whereby both of said actuators may be driven from one motor.

2. In a system having a pair of mechanical actuators: a motor for rotatably driving one of said actuators; a motor for rotatably driving the other of said actuators; field windings for said motors; shaft means mechanically coupling said actuators for rotation together; a magnetic clutch and brake unit connecting each of said motors to the corresponding actuator, said unit having brake means for holding said actuator against rotation and clutch means for coupling said actuator to the shaft of said motor, said unit having a brake coil for releasing said brake means, and a clutch coil for coupling said clutch means upon energization thereof; respective electrical circuits for connection to a power source and connected to both of said motors, each of said clutch coils being connected in series with the field winding of the corresponding motor; interlock means connecting each of said brake coils for releasing both of said brake means upon the energization of said circuit, whereby both of said actuators may be driven from either motor, said interlocking means operating to prevent the energization from the field windings of the other motor, whereby only the motor shaft of the energized motor is coupled to its actuator.

3. A system for operating a pair of mechanical actuators in unison which comprises: a motor for driving one of said actuators; another motor for driving the other of said actuators; two electro-magnetic clutch and brake units, each connected between one of said motors and its respective actuator, said clutch and brake units, when de-energized, braking said actuators to prevent movement thereof, and having a main electric coil which when energized releases said braking and couples said motor to said actuator and an auxiliary electric coil which when energized releases said braking, but does not couple said motor to said actuator; two electric control circuits, each connecting one of said motors and the main coil of its associated clutch and brake unit to an electric power source; and an interlocking circuit connecting the auxiliary coil of the clutch and brake units associated with each of said control circuits, said interlocking circuit having anti-feedback means which prevent the control circuit of one motor from feeding power to the other motor therethrough.

4. A system according to claim 3 in which said anti-feedback means comprises two rectifiers connected in said interlocking circuit in a back-to-back arrangement.

5. A system according to claim 3 in which said anti-feedback means comprises relays in each of said control circuits which connect said interlocking circuit to said control circuit when the motor connected to said control circuit is energized and disconnect said interlocking circuit from said control circuit when said connected motor is de-energized.

6. A system for operating a pair of mechanical actuators in unison which comprises: a first motor for driving one of said actuators; a first electro-magnetic clutch and brake unit connected between said first motor and actuator which, when de-energized, brakes said actuator to prevent movement thereof; a second motor for driving the other of said actuators; a second electro-magnetic clutch and brake unit disposed between said second motor and actuator which, when de-energized, brakes said actuator to prevent movement thereof; a main electric coil in each of said clutch and brake units which when energized releases said brake and couples said connected motor to its associated actuator; an auxiliary electric coil in each of said clutch and brake units which when energized releases said brake without coupling said connected motor to its associated actuator; a first control circuit for connecting said first motor to an electric power source with the main coil of said first clutch and brake unit in series therewith; a second control circuit for connecting said second motor to an electric power source with the main coil of said second clutch and brake unit in series therewith; a normally open actuating switch in each of said control circuits; a normally closed extend limit switch in each of said control circuits which is opened by its associated actuator when said actuator reaches its fully extended position; a first relay switch in each of said control circuits with a relay coil which closes said switch when energized and opens said switch when de-energized; a load limiting mechanism in each of said actuators which is operable by a predetermined overload; a normally closed load limit switch in each of said control circuits connected with the relay coil of each of said relay switches in such a manner that said relay coil is energized when said load limit switch is closed and de-energized when said load limit switch is opened, said load switches being actuated by their associated load limiting mechanism to open when said load limiting mechanism operates in response to an overload; a normally closed shorting switch in each of said control circuits connected in such a manner as to short said load limit switch and thereby prevent its opening from de-energizing said relay coil, said shorting switches being opened when said actuators closely approach their fully retracted position; and an interlocking circuit connecting said auxiliary coils to said control circuits, said interlocking circuit having anti-feedback means which prevent said second control circuit from supplying power to said first motor and said first control circuit from supplying power to said second motor.

7. A system according to claim 6 wherein said anti-feedback means comprises two rectifiers connected in said interlocking circuit in a back-to-back arrangement and series resistances connected in said interlocking circuit to limit the current therethrough.

8. A system according to claim 6 wherein said anti-feedback means comprises relays, in each of said control circuits which connect said interlocking circuit to said first control circuit only when said first motor is energized and connect said interlocking circuit to said second control circuit only when said second motor is energized; and series resistances connected in said interlocking circuit for limiting the current therethrough.

9. In a system having two actuators which are mechanically coupled together, two reversible electric motors for individually driving said actuators each having an extend field coil for causing rotation in a direction which extends said actuators and a retract field coil for causing rotation in a direction which retracts said actuators, and two electro-magnetic clutch and brake units individually connecting said motors and actuators each of which, when de-energized, brakes its connected actuator against movement and has a main electric coil which, when energized, releases said brake and couples said connected motor to its associated actuator and an auxiliary electric coil which, when energized, releases said brake, but does not couple said connected motor to its associated actuator, circuitry for electrically connecting said motors and coils to an electric power source for operating said actuators in unison in such a manner that upon failure of the motor driving one actuator the motor driving the other can drive both comprising: line circuit means for connecting the extend and retract field coils in each of said motors with the main coil of their associate clutch and brake unit in Y with the outer ends of said field coils separately connected to said power source and the outer end of said main coil connected to one side of the armature of each of said motors, the other side of said motor armatures and said power source being grounded; normally open switch means connected between each of said field coils and said power source for controlling the energization of said motor; extend circuit-interrupting means connected between said extend field coils and said power source which are normally closed, but open to deenergize said extend field coils when said actuator approaches the limit of its extension; retract circuit-interrupting means connected between said retract field coils and said power source which are normally closed, but open to de-energize said retract field coil by said actuator as it approaches the limits of its retraction; and means interconnecting said line circuit means on the load side of said circuit-interrupting means, said interconnecting means connecting said auxiliary electric coils of each of said clutch and brake units such that both are energized during operation of either of said motors, but preventing one of said motors from being energized through the line circuit means of the other.

10. A system according to claim 9 wherein the interconnecting means comprise resistance means connected between the outer ends of the extend and retract field coils of each of said motors; two rectifiers connected between the midpoints of each of said resistance means in a back-to-back arrangement; and means connecting the auxiliary coils of the clutch and brake units of each of said motors between ground and the common connection between said rectifiers.

11. A system according to claim 9 wherein the interconnecting means comprise resistance means adapted to be connected to the outer ends of the extend and retract field coils of each said motors; relay means which connect said resistance means only to a field coil which is energized; and means connecting the auxiliary coils of the clutch and brake units of each of said motors between ground and the common connection between the resistance means in each of said motors.

12. In a system having two actuators which are mechanically coupled together, two reversible electric motors for individually driving said actuators, each having an extend field coil for causing rotation in a direction which retracts said actuators, and two electro-magnetic clutch and brake units individually connecting said motors and actuators, each of which, when de-energized, brakes its connected actuator against movement and has a main electric coil which, when energized, releases said brake and couples said connected motor to its associated actuator and an auxiliary coil which, when energized, releases said brake, but does not couple said connected motor to its associated actuator, circuitry for electrically connecting said motors and coils to an electric power source for operating said actuators in unison in such a manner that upon failure of the motor driving one actuator the motor driving the other can drive both comprising: line circuit means for connecting the extend and retract field coils in each of said motors with the main coil of their associate clutch and brake unit in Y with the outer ends of said field coils separately connected to said power source and the outer end of said main coil connected to one side of the armature of each of said motors, the other side of said motor armatures and said power source being grounded; normally open switch means connected between each of said field coils and said power source for controlling the energization of said motor; extend circuit-interrupting means connected between said extend field coils and said power source which are normally closed, but open to de-energize said extend field coil when said actuator approaches the limit of its extension; retract circuit-interrupting means connected between said retract field coils and said power source, and include a relay which closes when its coil is energized and opens when its coil is energized and switch means for de-energizing said relay coil only when said actuator is subjected to a predetermined overload near its fully retracted position; means interconnecting said line circuit means on the load side of said circuit-interrupting means, said interconnecting means connecting said auxiliary electric coils of each of said clutch and brake units such that both are energized upon operation of either of said motors, but preventing one of said motors from being energized through the line circuit means of the other.

13. A system according to claim 12 wherein the interconnecting means comprise resistance means connected between the outer ends of the extend and retract field coils of each of said motors; two rectifiers connected between the mid points of each of said resistance means in a back-to-back arrangement; and means connecting the auxiliary coils of the clutch and brake units of each of said motors between ground and the common connection between said rectifiers.

14. A system according to claim 12 wherein the interconnecting means comprise resistance means adapted to be connected to the outer ends of the extend and retract field coils of each of said motors; relay means which connect said resistance means only to a field coil which is energized; and means connecting the auxiliary coils of the clutch and brake units of each of said motors between ground and the common connection between the resistance means in each of said motors.

References Cited in the file of this patent

UNITED STATES PATENTS

| 2,375,422 | Leland | May 8, 1945 |
| 2,469,269 | Lear | May 3, 1949 |
| 2,519,042 | Granberg et al. | Aug. 15, 1950 |
| 2,820,600 | Brunner | Jan. 21, 1958 |

FOREIGN PATENTS

| 436,983 | France | Feb. 6, 1954 |